June 21, 1949.   C. T. ALTFATHER   2,473,839
CONSTANT SPEED ELECTRIC MOTOR
Filed Sept. 27, 1947

WITNESSES:
E. A. McCloskey
Nw. L. Groome

INVENTOR
Conrad T. Altfather.
BY F. P. Lyle
ATTORNEY

Patented June 21, 1949

2,473,839

UNITED STATES PATENT OFFICE 2,473,839

CONSTANT-SPEED ELECTRIC MOTOR

Conrad T. Altfather, Basking Ridge, N. J., assignor to Westinghouse Electric Corporation, East Pittsburgh, Pa., a corporation of Pennsylvania Application September 27, 1947, Serial No. 776,543

8 Claims. (Cl. 318—330)

The present invention relates to electric motors and, more particularly, to a small, constant-speed motor which will operate at substantially the same speed on either alternating current or direct current.

Small, constant-speed electric motors, such as are used for timing purposes, have heretofore usually been alternating-current synchronous motors, which run at a fixed speed determined by the frequency of the current. There are numerous applications for these motors, however, where operation on direct current may be required, but no satisfactory type of motor has been available which could be used on either alternating current or direct current, and where direct-current operation has been required, it has been necessary either to utilize some different type of motor entirely, or to resort to the use of an inverter, or equivalent means, for operating an alternating-current motor from a direct-current source. Either of these expedients is, of course, undesirable.

The principal object of the present invention is to provide a constant-speed electric motor, suitable for use as a timing motor, which is capable of satisfactory operation at substantially the same constant speed on either alternating current or direct current.

The motor of the present invention is of a type in which the rotor is rotated by magnetic attraction between salient poles on the rotor and a stationary driving electromagnet which is intermittently energized, the energization of the driving magnet being controlled by contacts which are actuated by a vibrating spring kept in vibration by magnetic attraction between the salient poles of the rotor and a permanent magnet on the spring. Such a motor will run at a constant speed determined by the natural frequency of vibration of the spring, but motors of this type have heretofore been capable of satisfactory operation only on direct current. It is an important object of the invention to provide a motor of this type which will operate satisfactorily, and at substantially the same speed, on either alternating current or direct current.

Another object of the invention is to provide an electric motor of the type described which will always be reliably self-starting regardless of the position in which the rotor may have stopped after a previous period of operation, that is, regardless of whether the contacts which control the energization of the driving magnet are open or closed.

Other objects and advantages of the invention will be apparent from the following detailed description, taken in connection with the accompanying drawing, in which.

Figure 1:
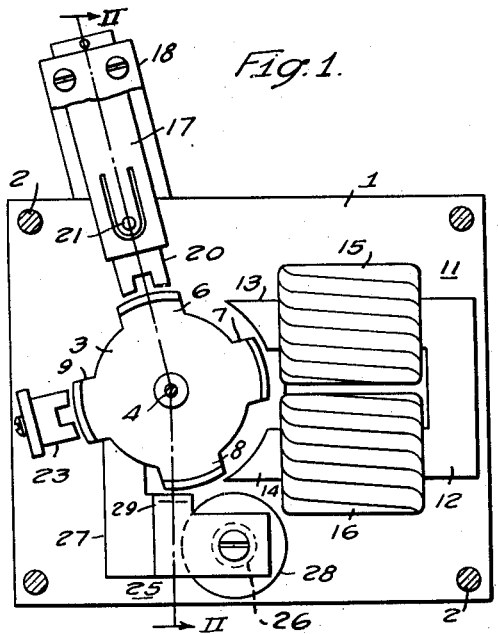
Figure 1 is a side view of the motor with one of the side-plates omitted.

The motor shown in the drawing is supported between two metal side-plates 1, which are fastened together, and spaced apart, by bolts 2, or in any other suitable manner. The motor has a rotor member 3, mounted on a shaft 4 which is supported in bearings 5 of any suitable type secured in the side-plates 1. The rotor 3 is made of a suitable magnetic material, such as soft iron, and is generally disc-shaped with a plurality of salient pole portions. Four poles 6, 7, 8 and 9 are provided in the particular embodiment illustrated in the drawing, and each of the salient pole portions extends radially from the body of the rotor 3 and is bent axially at its outer extremity, as clearly shown in Fig. 2. A flywheel 10 is preferably also mounted on the shaft 4 in order to somewhat increase the inertia of the rotating element so as to improve the operation on alternating current, as will be more fully explained hereinafter.

A main driving electromagnet 11 is supported between the side-plates 1 in any suitable manner. The driving magnet 11 has a generally U-shaped, laminated core 12 of magnetizable material, and the arms of the core, which form the poles 13 and 14 of the magnet, extend into close proximity to the outer periphery of the salient poles of the rotor 3, and are arcuately shaped at their ends, as shown in Fig. 1. The core 12 is magnetized by means of a coil which is preferably divided into two coil sections 15 and 16 placed on the poles 13 and 14, respectively. The poles 13 and 14 are spaced apart a distance approximately equal to the spacing between the rotor poles, and it will be apparent that if the coil sections 15 and 16 are energized when the rotor is in the position shown in Fig. 1, the rotor poles 7 and 8 will be attracted toward the magnet poles 13 and 14, respectively, and the rotor 3 will be given a rotational impulse in the counterclockwise direction.

The coil sections 15 and 16 are intermittently energized in order to give the rotor successive rotational impulses, and energization of the coil is controlled by means of a vibrating spring member 17. The spring 17 may be a generally rectangular piece of spring steel, or other suitable material, and, in the illustrated embodiment, the spring 17 is supported from the side-plates 1 by means of bracket arms 18 which are secured to the side-plates. The upper end of the spring 17 is clamped between the bracket arms 18, and is insulated from them by means of insulating spacers 19. A permanent magnet 20 is secured to the lower end of the spring 17, by welding or brazing.

Figure 2:
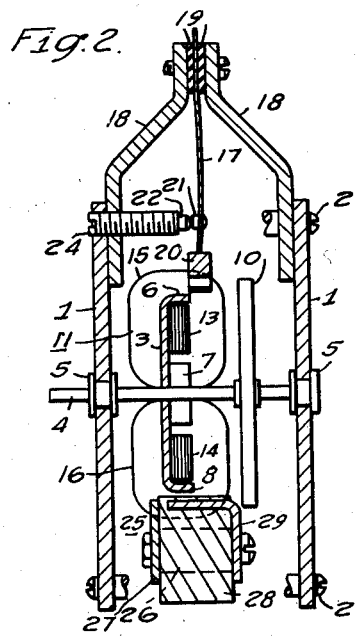
Fig. 2 is a transverse sectional view, approximately on the line II—II of Fig. 1.

The spring 17 is somewhat offset from the vertical plane of the rotor 3, with the permanent magnet 20 closely adjacent the outer periphery of the salient poles of the rotor. Thus, when the rotor is in the position shown in Fig. 1, with a pole opposite the magnet 20, the spring 17 will be drawn toward the rotor, as shown in Fig. 2, by the magnetic attraction between the rotor pole and the magnet 20. When the rotor has moved to the position shown in Fig. 3, with the magnet 20 in an intermediate position between two poles of the rotor, the magnetic attraction is sufficiently reduced to permit the spring 17 to swing away from the rotor. The spring 17 is angularly spaced from the center of the pole 13 of the driving magnet 11 a distance somewhat less than the spacing between the centers of the rotor poles.

A movable contact 21 is carried on the spring 17, preferably on a tongue portion cut out of the spring, so as to avoid undue interference with free vibration of the spring. A cooperating stationary contact 22 is adjustably supported on the side-plate 1 by means of a screw 24. The contacts 21 and 22 are connected in the circuit of the magnetizing coil sections 15 and 16, so as to control their energization, and it will be apparent that, as the spring 17 vibrates toward and away from the rotor, the contacts 21 and 22 will close and open, intermittently energizing the coils 15 and 16 to give successive impulses to the rotor, as more fully explained hereinafter.

A stationary permanent magnet 23 is preferably mounted on one of the side-plates 1. The purpose of the magnet 23 is to provide a positioning force to assist in stopping the rotor 3 in the position of Fig. 1 when the motor is deenergized, and the magnet 23 is placed so that it is angularly spaced from the spring 17 by a distance substantially equal to the angular spacing between adjacent poles of the rotor 3, so that the magnetic attraction between the magnet 23 and an adjacent rotor pole helps to stop the rotor in the desired position.

It is desirable for the rotor to stop in the position of Fig. 1 when the motor is deenergized so that the contacts 21 and 22 will be closed. In spite of the presence of the permanent magnet 23, however, the rotor will sometimes stop in the dead-center position of Fig. 3 with the contacts open. An auxiliary electromagnet 25 is provided in order to make the motor self-starting when this occurs. The electromagnet 25 includes a core 26 which is supported in any suitable manner from one of the side-plates by means of a bracket 27. A magnetizing coil 28 is wound on the core 26, and a pole piece 29 is secured to the core and extends close to the outer periphery of the rotor poles. The pole piece 29 is angularly spaced from the permanent magnet 23 a distance somewhat less than the angular spacing between the rotor poles, so that when the rotor is in the position of Fig. 3, with the magnets 20 and 23 midway between rotor poles, the pole 9 is in position to be attracted toward the pole piece 29 when the coil 28 is energized, so as to give the rotor a counterclockwise rotational impulse. The coil 28 is intended to be effectively energized only when the coil sections 15 and 16 are deenergized, as explained hereinafter.

Figure 5:
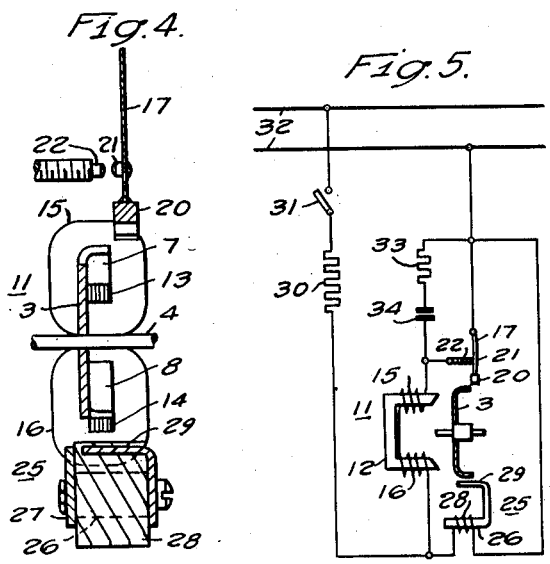
Fig. 5 is a schematic diagram showing the electrical connections of the motor.

The electrical connections of the motor are shown schematically in Fig. 5. The coil sections 15 and 16 are connected in series and to the stationary contact 22. The other end of the coil is connected to a relatively large resistor 30, the other end of which is connected, preferably through a line switch 31, to one side of the supply line 32, which may be either a direct-current line or a single-phase alternating-current line. The spring 17 is connected directly to the other side of the line 32, so that when the contacts 21 and 22 are closed, the coil sections 15 and 16 are connected across the line in series with the resistor 30. A small resistor 33 and capacitor 34 are preferably connected across the contacts to prevent sparking as the contacts rapidly open and close. The coil 28 of the auxiliary electromagnet 25 is connected in a shunt circuit across the main coil sections 15 and 16 and the contacts 21 and 22, and is designed to have much higher impedance than the main coil. The impedance of the coil 28 should be at least five times the combined impedance of the main magnetizing coil sections 15 and 16, and its impedance is preferably made much higher than this minimum value, since a sufficient rotational effect on the rotor can be obtained, even with a high-impedance coil, and the high impedance reduces heating of the coil 28 during continuous operation of the motor. When the contacts 21 and 22 close, the coil 28 is shunted by the relatively low-impedance coil sections 15 and 16, and thus the coil 28 is effectively energized only when the main coil is deenergized.

The operation of the motor is as follows. When the motor is deenergized with the rotor 3 in the position shown in Figs. 1 and 2, it will be seen that the spring 17 is drawn toward the rotor by the magnetic attraction between the permanent magnet 20 and the pole 6 of the rotor 3, and that the contacts 21 and 22 are closed. If the line switch 31 is now closed, the coil sections 15 and 16 are energized and the poles 7 and 8 of the rotor are attracted toward the poles 13 and 14 of the driving magnet 11, so that the rotor starts to rotate in the counterclockwise direction.

Figures 3, 4:
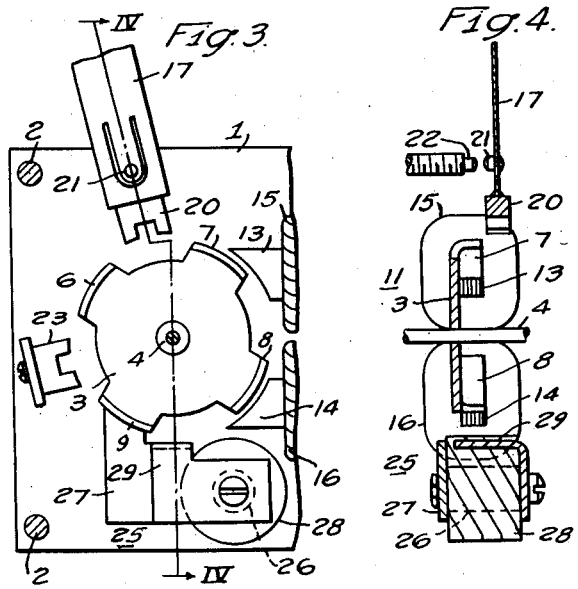
Fig. 3 is a fragmentary side view similar to Fig. 1, but showing the rotor in a different position.
Fig. 4 is a sectional view, approximately on the line IV—IV of Fig. 3.

As the rotor pole 6 moves away from the magnet 20, the magnetic attraction between the rotor and the permanent magnet 20 diminishes, and the spring swings away from the rotor to, or past, the position shown in Fig. 4, which opens the contacts 21 and 22 to deenergize the coil sections 15 and 16. The inertia of the rotor is sufficient to cause it to coast past this point, and the succeeding pole 7 approaches the position previously occupied by the pole 6 as the spring 17 vibrates back toward the rotor in accordance with its natural frequency of vibration, the return movement of the spring being aided by the magnetic attraction between the permanent magnet 20 and the approaching pole 7. This recloses the contacts 21 and 22 to again energize the coil sections 15 and 16 as the rotor poles 8 and 9 approach the magnet poles 13 and 14, respectively, thus giving another impulse of rotation to the rotor. It will be apparent that the rotor will continue to rotate under the successive impulses given to it by the driving magnet 11, the frequency of the impulses being determined by the natural frequency of vibration of the spring 17, which is kept in vibration by the magnetic attraction between the successive rotor poles and the permanent magnet 20. Thus, the motor will run at a constant speed determined by the natural frequency of the spring 17.

If the coil of the main driving magnet 11 were connected directly across the line 32 without the resistor 30, the motor would run as described above on direct current. If it were attempted to operate the motor on alternating current, however, the operation would be unreliable and unsatisfactory because, if the contacts 21 and 22 should close at or near a zero point of the voltage wave, the contacts would reopen before any appreciable impulse would be given to the rotor, and the motor would slow down or possibly stop, depending on the inertia of the load. Since this might occur frequently, or even on successive closures of the contacts, the motor would not run at constant speed, or might not run at all, and operation on alternating current would be unreliable and unsatisfactory. For this reason, motors of this type have been suitable for use only on direct current.

If the coil sections 15 and 16 are designed for low voltage, however, and a relatively large resistor 30 is connected in series with them, as shown in Fig. 5, the time constant of the circuit is sufficiently reduced so that the current in the circuit, and the resultant magnetic flux, build up at a relatively rapid rate when the contacts 21 and 22 close, and even if the contacts close near a zero point of the voltage wave, sufficient current will flow, and it will build up sufficiently fast in the coil, to give an appreciable driving impulse to the rotor to maintain uninterrupted and reliable rotation without appreciable change in speed. In order to obtain this effect, the resistance must be relatively large, and it has been found that satisfactory operation is obtained if the resistance of the resistor 30 is such that the voltage across the main coil sections 15 and 16 is not more than about 20% of the line voltage applied to the motor. Because of the rapid interruption of the current by the contacts 21 and 22, the voltage drop across the main coil is much greater than the resistance drop alone, even on direct current, and the resistance of the resistor 30 must be determined in view of this effect. In one specific embodiment of the invention, good results have been obtained with a resistor 30 having a resistance about fifteen times the combined direct current resistance of the coil sections 15 and 16.

The provision of the flywheel 10 on the shaft 4 also improves the operation on alternating current, since it helps the rotor to coast through periods of weak driving impulse, resulting from the closure of the contacts at a low point on the voltage wave, without noticeable loss of speed. It is not necessary to greatly increase the inertia of the rotor, however, and a relatively small flywheel is to be preferred since, if the inertia of the rotating member is too high, it may cause slow or uncertain starting of the motor, and a longer period of coast after the motor is deenergized, which may be undesirable in some applications.

It will be obvious, of course, that the rotor 3 might be designed with sufficient inertia to make it possible to omit the flywheel, but the use of a separate flywheel usually makes it possible to obtain the desired effect with less total weight.

The provision of the auxiliary electromagnet 25 is an important feature of the invention, since it insures reliable starting of the motor. It would be desirable for the rotor 3 to always stop in the position of Figs. 1 and 2 when the motor is deenergized, since the contacts 21 and 22 are closed in this position, and the motor will restart immediately upon closure of the line switch 31. The permanent magnet 23 provides a positioning force which tends to stop the rotor in the desired position, but in spite of the presence of this magnet, the rotor will sometimes stop in the dead-center position of Fig. 3 in which the permanent magnets 20 and 23 are midway between adjacent rotor poles. Since the contacts 21 and 22 are open when the rotor is in this position, the motor would not then be self-starting. The auxiliary electromagnet 25 is provided to effect starting of the motor when the rotor is in the dead-center position and, as shown in Fig. 3, its pole piece 29 is positioned so that when the coil 28 is energized, the adjacent rotor pole will be attracted toward the pole piece 29 and the rotor will move counter-clockwise.

The auxiliary magnet 25 does not have to be very strong, since only a relatively small force is required to move the rotor from the dead-center position, and as soon as it has so moved, the magnets 20 and 23 will attract the rotor to the position where the contacts 21 and 22 will close, and the motor will then continue to run as described above. The coil 28 of the auxiliary magnet 25 is a high-impedance coil, as previously described, and it is effectively energized only when the contacts 21 and 22 are open, since the coil 28 is substantially short-circuited by the relatively low-impedance coil sections 15 and 16 when the contacts are closed. Thus, there is no tendency for the auxiliary electromagnet 25 to cause any negative torque when the motor is running, but it insures positive and reliable starting of the motor irrespective of the position of the rotor.

It should now be apparent that an electric motor has been provided which is reliably self-starting and which is capable of constant-speed operation on either alternating current or direct current, the speed of the motor being determined by the natural frequency of vibration of the spring 17, so that it is substantially independent of the frequency when used on alternating current. A preferred embodiment of the invention has been shown and described for the purpose of illustration, but it is to be understood that various other embodiments and modifications are possible within the scope of the invention. The invention is therefore not limited to the particular details of construction shown and described, but in its broadest aspects, it includes all equivalent embodiments and modifications which come within the scope of the appended claims.

I claim as my invention:

1. An electric motor comprising a rotor member of magnetic material having a plurality of salient pole portions, a pole member of magnetizable material adjacent the rotor member, said pole member being positioned to attract said salient pole portions of the rotor member to effect rotation of the rotor member, a magnetizing coil on the pole member, a vibratory spring member mounted to vibrate axially of the rotor member, a permanent magnet supported on said spring member in position to be attracted by the salient pole portions of the rotor member, contact means actuated by movement of the spring member for controlling the energization of said magnetizing coil, and a fixed resistor connected in series with said coil, the resistance of said resistor being relatively large as compared to that of the magnetizing coil, so that the time constant of the series circuit comprising the resistor and coil is substantially less than that of the coil alone.

2. An electric motor as defined in claim 1 in which the resistance of the resistor is such that the voltage across the coil is not more than about 20% of the voltage applied to the series circuit comprising the resistor and coil.

3. An electric motor comprising a rotor member of magnetic material having a plurality of salient pole portions, a pole member of magnetizable material adjacent the rotor member, said pole member being positioned to attract said salient pole portions of the rotor member to effect rotation of the rotor member, a magnetizing coil on the pole member, a vibratory spring member mounted to vibrate axially of the rotor member, a permanent magnet supported on said spring member in position to be attracted by the salient pole portions of the rotor member, contact means actuated by movement of the spring member, said contact means being connected to control the energization of said magnetizing coil, whereby the coil is intermittently energized as the spring member vibrates toward and away from the rotor member, and auxiliary electromagnetic means positioned to attract the salient pole portions of the rotor member to effect rotation of the rotor member, said auxiliary electromagnetic means being connected to be effectively energized only when said magnetizing coil is deenergized.

4. An electric motor comprising a rotor member of magnetic material having a plurality of salient pole portions, a pole member of magnetizable material adjacent the rotor member, said pole member being positioned to attract said salient pole portions of the rotor member to effect rotation of the rotor member, a magnetizing coil on the pole member, a vibratory spring member mounted to vibrate axially of the rotor member, a permanent magnet supported on said spring member in position to be attracted by the salient pole portions of the rotor member, contact means actuated by movement of the spring member, said contact means being connected to control the energization of said magnetizing coil, whereby the coil is intermittently energized as the spring member vibrates toward and away from the rotor member, and auxiliary electromagnetic means positioned to attract the salient pole portions of the rotor member to effect rotation of the rotor member, said auxiliary electromagnetic means having a pole piece and a magnetizing coil, and means for connecting said last-mentioned coil in shunt relation to the first-mentioned coil and the contact means, the coil of the auxiliary electromagnetic means having relatively high impedance as compared to that of the first-mentioned coil.

5. An electric motor as defined in claim 4 in which the impedance of the magnetizing coil of the auxiliary electromagnetic means is at least five times the impedance of the first-mentioned coil.

6. An electric motor comprising a rotor member of magnetic material having a plurality of salient pole portions, a pole member of magnetizable material adjacent the rotor member, said pole member being positioned to attract said salient pole portions of the rotor member to effect rotation of the rotor member, a magnetizing coil on the pole member, a resistor connected in series with said coil, a vibratory spring member mounted to vibrate axially of the rotor member, a permanent magnet supported on said spring member in position to be attracted by the salient pole portions of the rotor member, contact means actuated by movement of the spring member, said contact means being connected to control the energization of said magnetizing coil, whereby the coil is intermittently energized as the spring member vibrates toward and away from the rotor member, and auxiliary electromagnetic means positioned to attract the salient pole portions of the rotor member to effect rotation of the rotor member, said auxiliary electromagnetic means being connected to be effectively energized only when said magnetizing coil is deenergized.

7. An electric motor comprising a rotor member of magnetic material having a plurality of salient pole portions, a pole member of magnetizable material adjacent the rotor member, said pole member being positioned to attract said salient pole portions of the rotor member to effect rotation of the rotor member, a magnetizing coil on the pole member, a resistor connected in series with said coil, the resistance of said resistor being such that the time constant of the series circuit comprising the resistor and coil is substantially less than the time constant of the coil alone, a vibratory spring member mounted to vibrate axially of the rotor member, a permanent magnet supported on said spring member in position to be attracted by the salient pole portions of the rotor member, contact means actuated by movement of the spring member, said contact means being connected to control the energization of said magnetizing coil, whereby the coil is intermittently energized as the spring member vibrates toward and away from the rotor member, and auxiliary electromagnetic means positioned to attract the salient pole portions of the rotor member to effect rotation of the rotor member, said auxiliary electromagnetic means having a pole piece and a magnetizing coil, and means for connecting said last-mentioned coil in shunt relation to the first-mentioned coil and the contact means, the coil of the auxiliary electromagnetic means having relatively high impedance as compared to that of the first-mentioned coil.

8. An electric motor as defined in claim 7 in which the resistance of the resistor is such that the voltage across the first-mentioned coil is not more than about 20% of the voltage applied to the series circuit comprising the resistor and coil, and in which the impedance of the magnetizing coil of the auxiliary electromagnetic means is at least five times the impedance of the first-mentioned coil.

CONRAD T. ALTFATHER.

REFERENCES CITED

The following references are of record in the file of this patent:

UNITED STATES PATENTS

| Number | Name | Date |
|---|---|---|
| 678,874 | Heaney | July 23, 1901 |
| 1,723,084 | Sibley | Aug. 6, 1929 |
| 2,266,037 | Hemenger et al. | Dec. 16, 1941 |
| 2,282,582 | Hemenger et al. | May 12, 1942 |